US006898894B1

(12) United States Patent
Anderson (10) Patent No.: US 6,898,894 B1
(45) Date of Patent: May 31, 2005

(54) FISHING JIG WITH INTERCHANGEABLE JIG HEAD

(76) Inventor: James W. Anderson, 1810 S. 1st Ave., Sioux Falls, SD (US) 57105

( * ) Notice: Subject to any disclaimer, the term of this patent is extended or adjusted under 35 U.S.C. 154(b) by 0 days.

(21) Appl. No.: 10/342,571

(22) Filed: Jan. 15, 2003

Related U.S. Application Data (60) Provisional application No. 60/352,902, filed on Jan. 29, 2002.

(51) Int. Cl.[7] .............................................. A01K 83/06
(52) U.S. Cl. .................................... 43/44.81; 43/42.39
(58) Field of Search .......................... 43/42.09, 42.37, 43/42.38, 42.39, 44.81

(56) References Cited

U.S. PATENT DOCUMENTS

| 4,530,180 | A | * | 7/1985 | Gwaldacz et al. | ......... 43/42.28 |
| 4,796,378 | A |   | 1/1989 | Krueger et al. | |
| 5,105,575 | A | * | 4/1992 | Robertaccio | ................ 43/44.8 |
| 5,261,182 | A | * | 11/1993 | Link | .......................... 43/42.36 |
| 5,339,559 | A | * | 8/1994 | Strobbe | ..................... 43/42.37 |
| 5,428,918 | A | * | 7/1995 | Garrison | .................... 43/42.28 |
| 5,491,927 | A | * | 2/1996 | Ortiz | ......................... 43/42.28 |
| 5,499,471 | A | * | 3/1996 | Foutch et al. | ............... 43/42.31 |
| 5,517,782 | A | * | 5/1996 | Link et al. | .................. 43/42.31 |
| 5,524,378 | A | * | 6/1996 | Hood | ......................... 43/42.31 |
| 5,537,775 | A |   | 7/1996 | Crumrine | |
| 5,551,185 | A | * | 9/1996 | Reed | ......................... 43/42.39 |
| 5,680,726 | A |   | 10/1997 | Sassone | |
| 5,899,015 | A |   | 5/1999 | Link | |
| 6,233,863 | B1 | * | 5/2001 | Dotson | ..................... 43/42.09 |

* cited by examiner

*Primary Examiner*—Kurt Rowan

(57) ABSTRACT

A fishing jig system with an interchangeable jig head is disclosed for permitting a variety of jig heads with different configurations and functions to be used with a single jig hook and avoid having to remove the jig hook from a fishing line to reconfigure the fishing jig. The jig system includes a hook having a shank portion and an eye portion, with the shank portion and the eye portion meeting at a juncture. A modular mounting member is mounted on the hook at the juncture for removably receiving a fishing accessory. A fishing accessory, such as a jig head, is removably mounted on the modular mounting member, and the fishing accessory has a recess formed therein for slidably receiving at least a portion of the modular mounting member such that the accessory may be removed and replaced without removing the jig hook from the fishing line.

27 Claims, 10 Drawing Sheets

FISHING JIG WITH INTERCHANGEABLE JIG HEAD

CROSS REFERENCE TO RELATED APPLICATION

This application claims the benefit of U.S. Provisional Application No. 60/352,902, filed Jan. 29, 2002.

BACKGROUND OF THE INVENTION

1. Field of the Invention

The present invention relates to fishing jigs and more particularly pertains to a new fishing jig with an interchangeable jig head for permitting a variety of jig heads with different configurations and functions to be used with a single jig hook while avoiding having to remove the jig hook from a fishing line to reconfigure the fishing jig.

2. Description of the Prior Art

The purpose of a fishing jig is to stimulate or attract fish to bite the jig hook instead of competing natural prey. Jig head color, shape, size, buoyancy and weight contribute to that purpose by imitating or emphasizing attached live or artificial bait. In addition, various modifications such as skirts, rattlers, weed guards, stinger hooks, flashers, spoons and other items improve attractiveness or performance. Jigs can also be tipped with various minnows, leaches, worms, grubs and other salt or fresh water live or natural baits.

Each fishing outing is unique and all combinations of the above variables can affect whether or not fish will bite. For example, a fish population that aggressively hits a black ¼ ounce jig tipped with a leach on Tuesday might ignore that offering and lightly tap a red ⅛ ounce skirted jig on Thursday. Changing fish appetites and levels of aggression can be attributed to altered environmental conditions such as barometric pressure, light, wind, moon phase, seasons and other variables. Localized influences, such as water clarity, water temperature, salinity, acidity, depth, natural prey availability, population density and other variables, also affect each fish population's affinity for various jig combinations.

All of these factors will change over a year, many within thirty minutes. Predicting the response of fish to these changes is difficult and most, if not all, fishermen resort to trial and error to determine which jig combination is effective for that particular outing. Because fishermen endeavor to catch fish (and often to release them again), their ability to stay in sync with the preferences of their prey will dictate the degree of their success.

It is thus desirable to have a quick and efficient means to create combinations of these variables while employing a minimum amount of fishing equipment.

Known fishing jigs have been composed of a jig head of various materials, such as a colored metal material (for example, lead) or a buoyant material (such as expanded polystyrene), and various shapes and weights, molded directly and inseparably to a jig hook. Various modifications can include: barbed collars molded as part of the lead-metal jig heads to permit attachment of imitation baits or to provide an anchor for permanently attached skirts; weed guards and eyelets (for attachment of a stinger hook, flasher or spoon) permanently molded into lead jig heads; and recesses permanently molded into the jig head to accommodate rattlers. Thus, in the prior art, each jig has a permanent color, shape, size, buoyancy, and weight.

Jigs are tied directly to fishing line using a knot that is intended not to come untied. (Jig fishing methods, with an exception for floating jigs, do not employ sinkers, leaders, snaps, bobbers or other line gear.) Because the known jigs have a permanent color, shape, size, buoyancy and weight, in order to try different combinations of color, shape, buoyancy and weight in the jig used, a fisherman has to change the entire jig tied to the fishing line. A similar lack of options exists for skirts, rattlers, weed guards, stinger hooks, flashers, spoons and other jig modifications—in order to change between these modifications, the entire jig needs to be changed and/or the bait removed from the hook of the jig.

Changing between jigs requires cutting the fishing line, removing the live or artificial bait from the old jig, possibly cleaning paint out of the eyelet of a new jig, threading the eyelet of the new jig, re-tying the line to the new jig and reattaching the old live or artificial bait. When the live bait is damaged from the removal process, or from environmental factors such as sunlight or dry air, new bait may need to be retrieved and attached. All of these steps take time that could otherwise be spent actually fishing.

Fishermen catch fish more fish if their hook is in the water and the jig is the correct jig for the current conditions. The prior art jigs have either compelled fishermen not to seek more effective jig combinations, or have greatly reduced the amount of time fishermen have had their hooks in the water. Under either scenario, the prior art jigs have deprived sport fishermen of enjoyment and reduced the profits of commercial fishermen.

In these respects, the fishing jig with interchangeable jig head according to the present invention substantially departs from the conventional concepts and designs of the prior art.

SUMMARY OF THE INVENTION

In view of the foregoing disadvantages inherent in the known types of fishing jigs now present in the prior art, the present invention provides a new fishing jig with interchangeable jig head that may be utilized for permitting a variety of jig heads with different configurations and functions to be used with a single jig hook while avoiding having to remove the jig hook from a fishing line to reconfigure the fishing jig.

To attain this benefit, the present invention generally comprises a fishing jig system that employs an interchangeable jig head. The jig system includes a hook having a shank portion and an eye portion. A modular mounting member is mounted on the hook for removably receiving a fishing accessory. A fishing accessory, such as a jig head, is removably mounted on the modular mounting member, and the fishing accessory has a recess formed therein for slidably receiving at least a portion of the modular mounting member such that the accessory may be removed and replaced without removing the jig hook from the fishing line.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The most significant advantage of the present invention is the ability of the user of the inventive jig to exchange jig heads on the jig hook without having to remove the jig hook from the fishing line and replacing it with another jig hook into order to change the function, or appearance, or other characteristics of the fishing jig.

Further advantages of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects of the invention will become apparent when consideration is given to the following detailed description thereof. Such description makes reference to the annexed drawings wherein.

DESCRIPTION OF PREFERRED EMBODIMENTS

With reference now to the drawings, and in particular to FIGS. 1 through 10 thereof, a new fishing jig with interchangeable jig head embodying the principles and concepts of the present invention and generally designated by the reference numeral 10 will be described.

In general, and as best illustrated in FIGS. 1 through 10, the modular fishing hook accessory mounting system 10 of the invention provides fishermen and fisherwomen with a means for quickly and efficiently changing jig head color, shape, size, buoyancy, weight and other variables. The system 10 is composed of a jig hook and a jig head which is removably attached to the jig hook in a manner that permits secure attachment and also quick removal and replacement of the jig head to vary the function, appearance, and operation of the system. For example, the jig head may be manufactured in a variety of colors, shapes, sizes, weights, and other variables. Most significantly, mounting means are provided that permits the removal and replacement of the jig head on the hook at the pleasure of the fisherman while eliminating the need to cut the fishing line from the hook, remove the live or artificial bait from the hook, clean paint out of the eye of a new hook, thread the eye of the new hook with the line, re-tie the line on the new hook, and then re-attach the old (or new) live or artificial bait to the hook.

In greater detail, the system 10 of the invention includes a hook 12 having a shank portion 14 and an eye portion 16. The eye portion 16 may be located at one end of the shank portion 14, and the shank portion and the eye portion may meet or converge at a juncture 18. In most embodiments of the invention, the portions 14, 16 of the hook are formed from a single piece of wire. The shank portion 14 may be substantially linear or straight, and the eye portion 16 may lie in a plane that is oriented substantially perpendicular to a longitudinal axis of the shank portion. Thus, in one embodiment of the invention, the shank 14 and eye 16 portions forms an angle of approximately 90 degrees at the juncture 18.

The system 10 of the invention also includes a modular mounting member 20 that is mounted on the hook 12 for removably receiving a fishing accessory. The modular mounting member 20 may be located at the juncture 18 of the hook 12. The modular mounting member may be relatively elongate with a longitudinal axis.

The modular mounting member 20 may include a mounting portion 22 that is mounted on the hook 12, and that may embrace the juncture 18 of the hook. The mounting portion 22 may extend along a portion of the hook 12 that is located adjacent to the juncture 18. The mounting portion 22 may extend along a section of the shank portion 14 of the hook 12, and may also extend along a section of the eye portion 16 of the hook. The mounting portion 22 may include a rib 24 that extends from the eye portion 16 toward a throat 24 of the hook 12.

The modular mounting member 20 of the invention may also include an insertion portion 26 for inserting into the fishing accessory. The insertion portion 26 may extend along a section of the shank portion 14 of the hook 12, and may be elongate in nature. In one embodiment of the invention, a longitudinal axis of the insertion portion 26 is laterally offset from a longitudinal axis of the shank portion 14 of the hook 12. The exterior of the insertion portion 26 may be substantially cylindrical in shape.

The modular mounting member 20 may also include securing means or structure for removably securing the fishing accessory on the modular mounting member 20. The securing structure may extend beyond the eye portion 16 of the hook 12 at the juncture 18, and may comprise an extension of the insertion portion for also being inserted into the fishing accessory. The securing structure may comprise a pair of securing fingers 30, 31 that are spaced from each other to define a gap 32 therebetween. The pair of securing fingers 30, 31 may be resiliently flexible in nature, such that the fingers are movable toward each other by the application of sufficient force to thereby minimize the size of the gap. The pair of securing fingers 30, 31 may extend substantially parallel to each other.

In one embodiment of the securing fingers of the invention, a retaining nub 34, 35 is formed on each of the securing fingers 30, 31. The retaining nubs 34, 35 may extend in substantially opposite directions from each other. Each of the nubs 34, 35 may have a tapered thickness toward a first end 36 of the nub. Further, each of the nubs may form a ledge 38, 39 toward a second end 40 of the nub. The ledge 38, 39 may function to resist the sliding of the fishing accessory over the nubs unless, and until, the securing fingers are deflected inwardly toward each other to reduce the maximum diameter of the retaining nubs.

In some embodiments of the invention, the modular mounting member may also include an extension portion 42 that may extend from the insertion portion 26. The extension portion may extend along a section of the shank portion 14 of the hook 12 from the insertion portion 26 toward the throat 13 of the hook. Illustratively, the extension portion 42 may have a length of approximately 0.4 to 0.5 inches, leaving approximately 0.5 inches of the shank portion 14 exposed.

Figure 1:
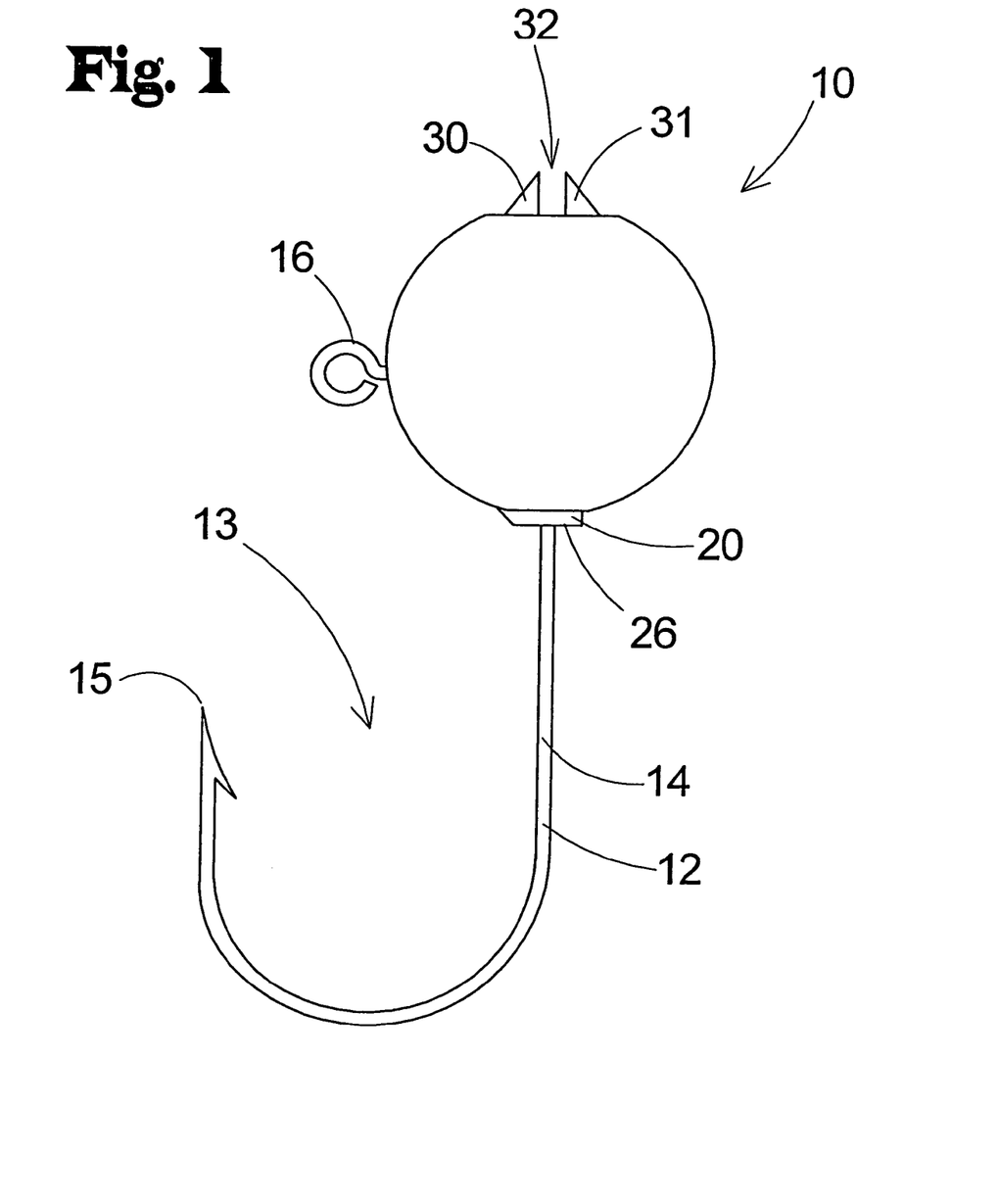
FIG. 1 is a schematic side view of a new fishing jig with an interchangeable jig head according to the present invention.
Figure 2:
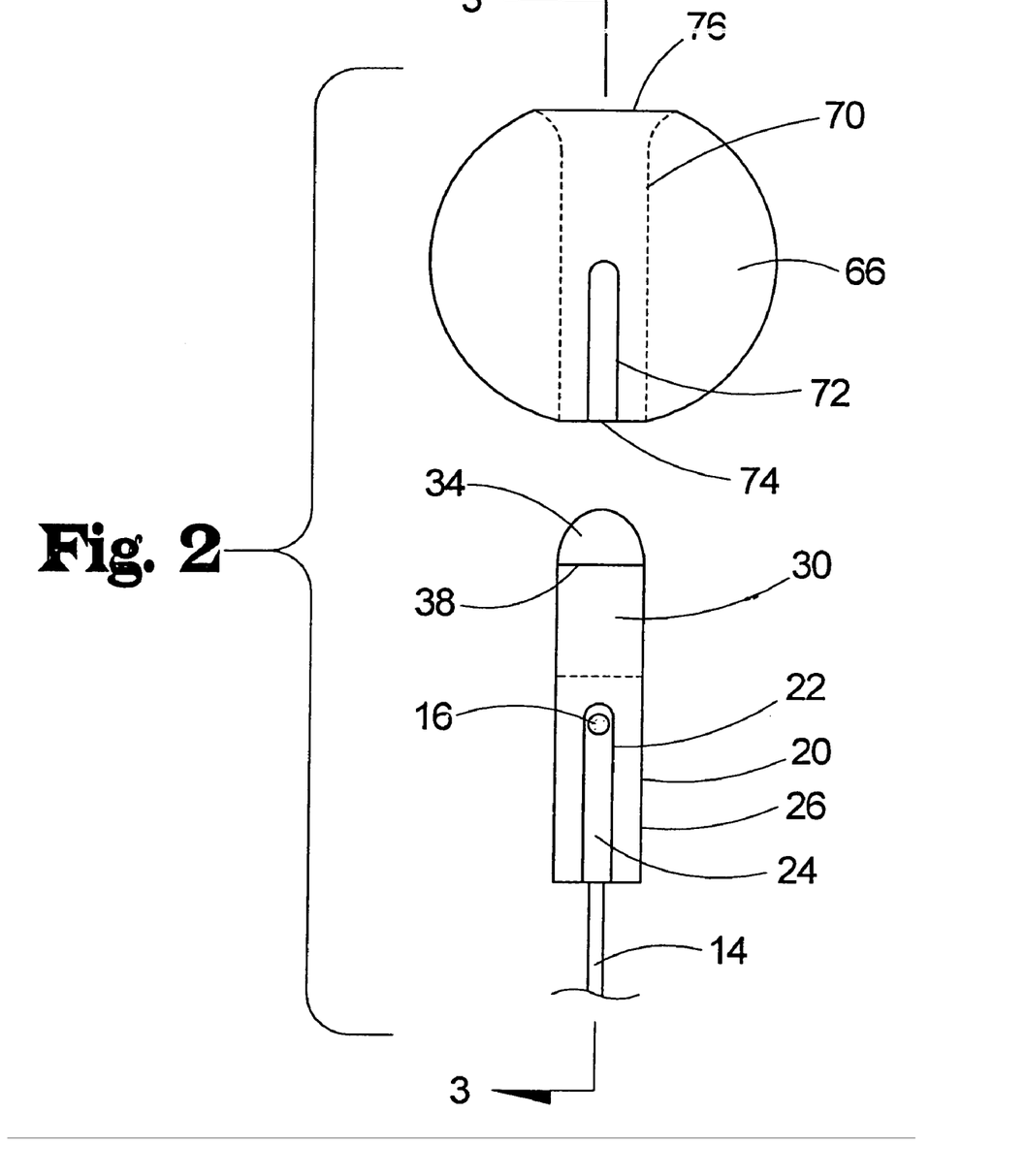
FIG. 2 is a schematic partial front view of the present invention showing the jig hook and jig head in an exploded condition.
Figure 3:
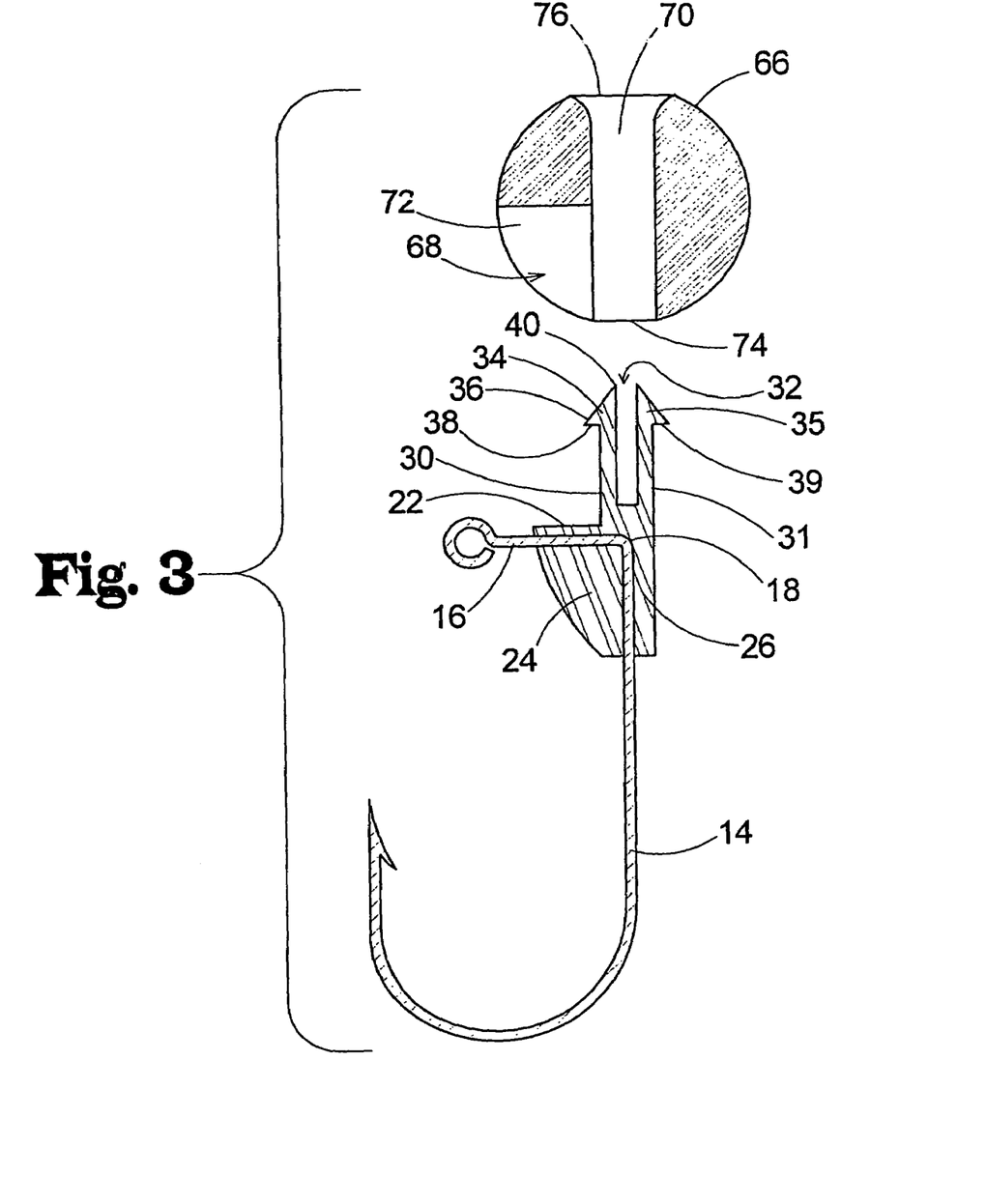
FIG. 3 is a schematic sectional view of the exploded configuration of the present invention as taken along line 3—3 of FIG. 2.
Figure 4:
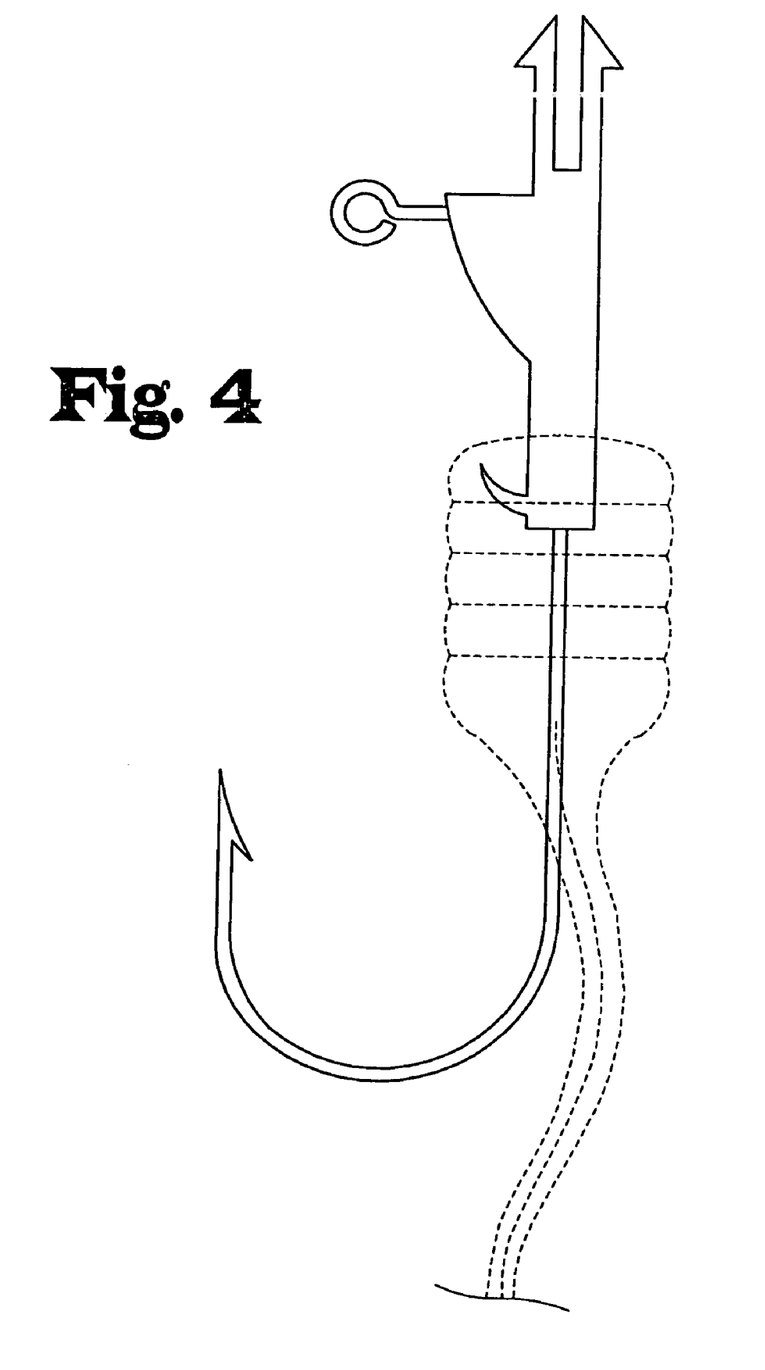
FIG. 4 is a schematic side view of the present invention with an optional extension of the modular mounting member having a barb formed thereon for mounting an article of artificial bait.
Figure 5:
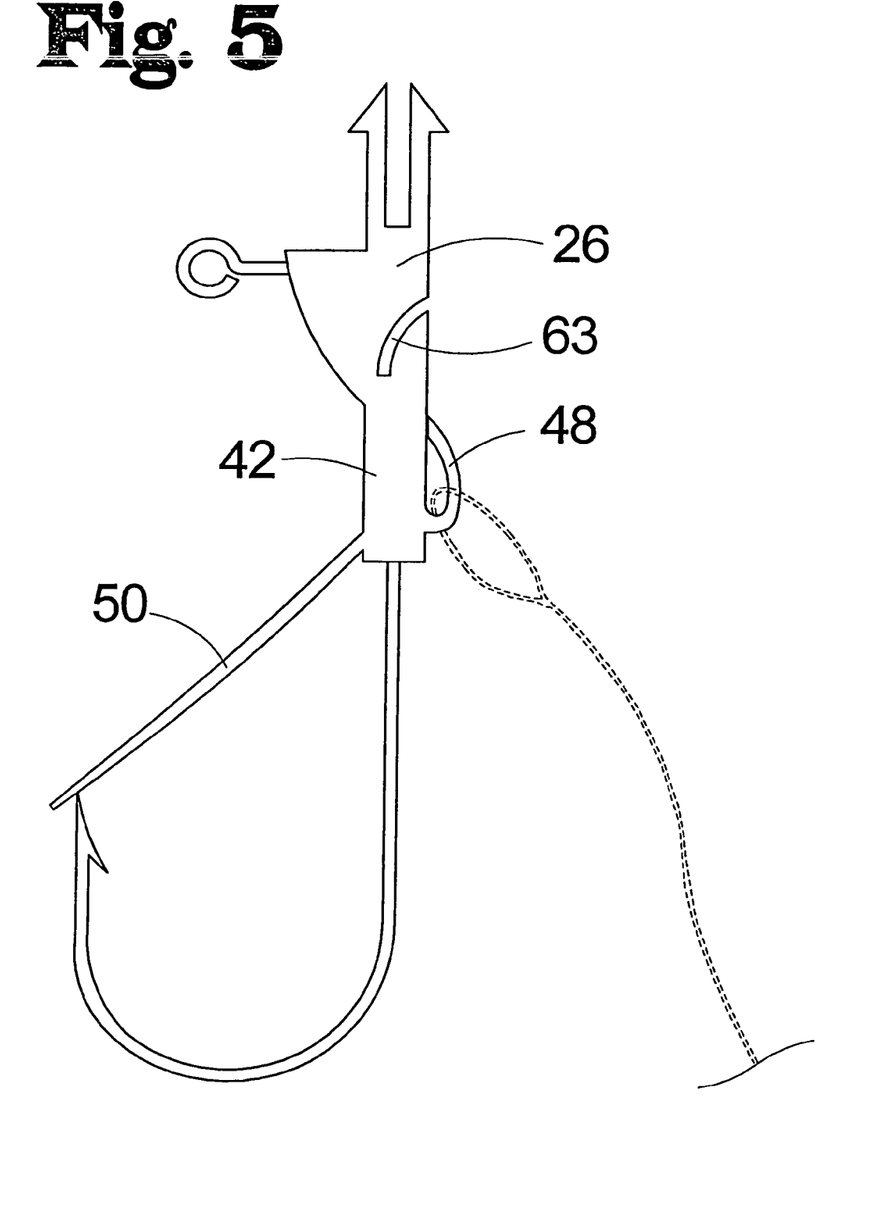
FIG. 5 is a schematic side view of the present invention with an optional extension of the modular mounting member having a weed guard and a clip hoof formed thereon for mounting an article of fishing tackle such as a stinger hook.
Figure 6:
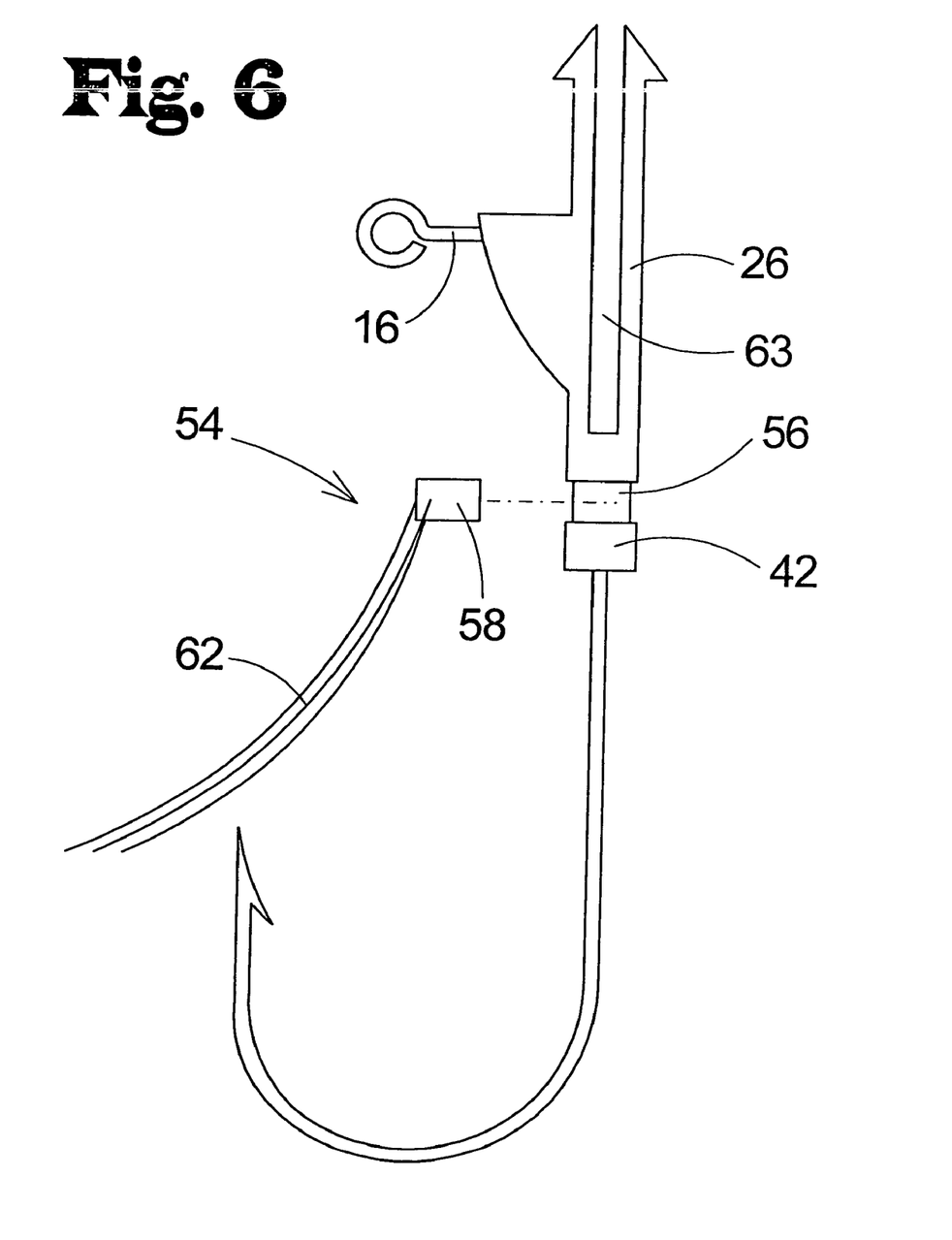
FIG. 6 is a schematic side view of the present invention with an optional extension of the modular mounting member having a retainer groove formed therein for removably receiving a clip of a fishing article assembly.
Figure 7:
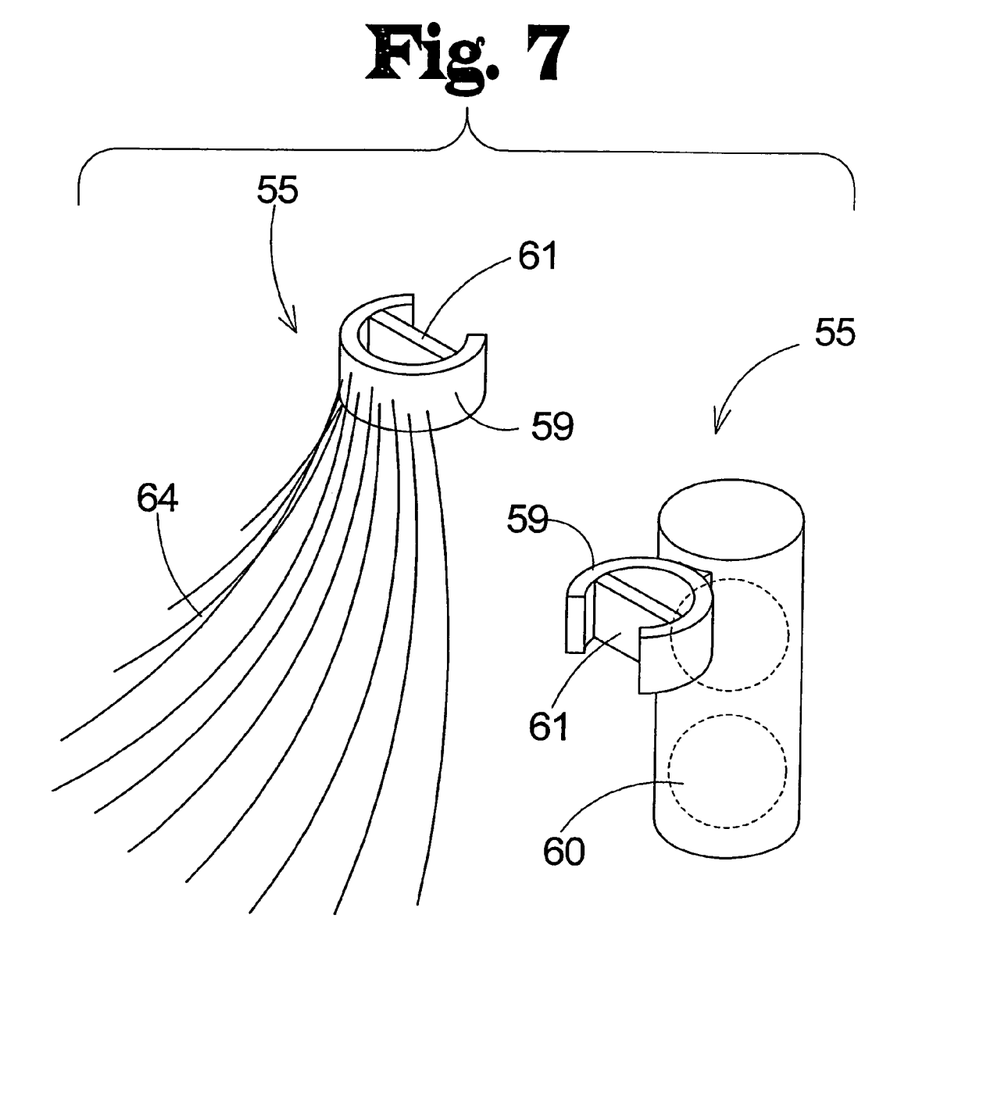
FIG. 7 is a schematic side view of various optional fishing article assemblies that may be removably attached on the retainer groove of the present invention shown in FIG. 6.

In one embodiment of the invention, the extension portion 42 may optionally include a barb 44 for removably engaging an article of artificial bait. The barb 44 may have a tip 46 on a free end of the barb, and the tip may extend toward the eye portion 16 of the hook 12 and may also extend toward the mounting portion 22 of the modular mounting member. The extension portion 42 may optionally include a clip hook 48 for removably engaging a fishing accessory. The clip hook 48 may be positioned away from the eye portion 16 of the hook and may be positioned away from the mounting portion 22 of the modular mounting member. The clip hook 48 may be substantially arcuate along its length such that the clip hook extends away from and then back towards the shank portion 14 of the hook. The extension portion 42 may also optionally include a weed guard 50 for diverting weeds from the throat 13 of the hook 12 to reduce the chance for snagging the hook on submerged weeds. The weed guard 50 may extend from a location adjacent to the shank portion 14 of the hook across the throat 13 of the hook toward a point 15 of the hook. As a further option, the extension portion 42 may include a skirt of filaments mounted thereon that extend generally in a direction away from the insertion portion 26 of the modular mounting member 20.

As a still further option, a removable fishing article assembly may be provided for removably engaging the extension portion 42 of the modular mounting member 20. The removable fishing article assembly may include a fishing article, and the fishing article may comprise a rattle-producing structure 60 (see FIG. 7) that produces a rattle when the hook is moved through water with the rattle-producing structure is mounted on the hook. The fishing article may comprise a weed guard 62 (see FIG. 6) that includes at least one strand that extends across the throat 13 of the hook toward the point 15 of the hook for resisting the entanglement of the hook with weeds. The fishing article may comprise a skirt 64 (see FIG. 7) that comprises a plurality of filaments of a nature that is believed to be attractive to fish.

The removable fishing article assembly may employ a variety of mounting structures to removably mount the fishing article to the modular mounting member 20, and it should be understood that the various fishing articles identified above may be employed with any of the mounting structure. In one embodiment of the removable fishing article assembly 54 (see FIG. 6), the extension portion 42 of the modular mounting member 20 may have a substantially annular retainer groove 56 that extends about at least a portion of the extension portion. The fishing article assembly 54 may comprise a retainer clip 58 for removably mounting on the extension portion 42 in the retainer groove 56. The retainer clip 58 may comprise a ring with a break formed in the ring for permitting the extension portion 42 to pass through the break to permit the retainer clip to engage the retainer groove.

In another embodiment of the removable fishing article assembly 55, a retainer clip 59 (see FIG. 7) is employed that includes a retainer bar 61 that extends across the opening of the clip 59. The retainer bar 61 may be removably insertable into a slot 63 that is formed in the modular mounting member 20. For example, the slot 63 may be extend inwardly from the side of the mounting member 20 and may be substantially arcuate (see FIG. 5). In another optional embodiment, the slot 63 may be formed by an extension of the gap 32 between the securing fingers 30, 31 (see FIG. 6), that extends beyond the jig head 66 when mounted on the mounting member 20. The bar 61 may be slid into and out of the slot 63 as the different fishing accessories are desired to be used.

The system of the invention also includes a fishing accessory for removably mounting on the modular mounting member 20. The fishing accessory may comprise a jig head 66 of the nature that is typically permanently mounted on a jig hook, and for the purposes of this description, the jig head will be described as the fishing accessory, although other fishing accessories may suitably be employed and removably mounted on the hook using the modular mounting member 20.

The jig head 66 may have a recess 68 that is formed therein for receiving at least a portion of the modular mounting member 20. The recess 68 may include a passage 70 that extends through the jig head for receiving the insertion portion 26 of the modular mounting member. The passage 70 of the recess 68 may be substantially cylindrical for accepting and snugly fitting on the insertion portion of the modular mounting member. The ends of the securing fingers 30, 31 may protrude from the jig head 69 when the jig head is mounted on the mounting portion, or may be oriented substantially flush with an outer surface of the jig head. Significantly, the interior size or diameter of the passage 70 is smaller than an outermost dimension of the nubs 34, 35 of the securing fingers 30, 31 such that the securing fingers are moved inwardly toward each other when the securing fingers and the insertion portion are inserted into the passage. The passage 70 may have a proximal end opening 74 and a distal end opening 76 in the exterior surface of the jig head. The distal end opening 75 may be flared in diameter with respect to a middle portion of the passage for permitting the nubs 34, 35 (and thus the securing fingers) to expand outwardly into an unbiased or relaxed position in the distal end opening. This relaxation of the fingers 30, 31 when the securing fingers are fully inserted into the passage 70 permits the nubs 34, 35 to retain the jig head on the modular mounting member 20 until the user pinches or otherwise moves the fingers inwardly toward each other to permit the fingers to pass through the passage 70. Illustratively, the insertion portion 36 of the modular mounting member 20 may have an approximately 0.05 inch diameter, and thus the passage 70 of the recess may be just slightly larger to ensure a snug fit.

The recess 66 may also include a slot 72 that is in communication with the passage 70 for receiving the mounting portion 22 of the modular mounting member 20. The slot 72 is suitable for accepting the rib 24 of the mounting portion 22 of the modular mounting portion. The slot 72 may be formed by spaced, substantially parallel surfaces on the interior of the jig head, and the slot may extend over a substantially 90 degree arc of the interior of the jig head.

The exterior shape of the jig head 66 may vary, and in one embodiment of the invention, the jig head 66 may comprise a substantially spherically-shaped object, although other shapes may be employed, such as novelty shapes (for example, a football shape) or fishing attracting shapes (for example, a grub shape).

The function or purpose of the jig head 66 may also vary, and in one embodiment of the invention, the jig head comprises a weight formed of a metallic material. The jig head 66 may also be formed of a material having a density less than water such that the jig head tends to float, or move the hook upwardly toward a surface of a body of water, when the jig head is mounted on the hook 12 and placed in the body of water.

As can be appreciated from the foregoing, the jig head 66 may be easily replaced on the hook 12 with a similar jig head, or with a jig head having a different weight, or different buoyancy, or different shape, or a different color, as is desired by the user to achieve the most effective set up for the conditions under which the user is fishing.

It should be recognized that the jig may comprise a metal, a plastic such as expanded polystyrene foam, or other suitable material that provides the desired physical characteristics, such as, for example, density with respect to water. The jig head may be painted, dyed, dipped or otherwise colored or tinted. The jig head may be made in various sizes, various shapes, various weights and various degrees of buoyancy. While the recess of the jig head with the slot and passage is characteristic of one highly preferred embodiment of the invention, it should be realized that the slot and passage may be altered and still achieve the same function disclosed herein. The hook may be provided with a snell or not provided with a snell. The eye portion may form an angle with the shank portion of approximately 45 degrees, approximately 90 degrees, or even 0 degrees (substantially straight).

Figure 8:
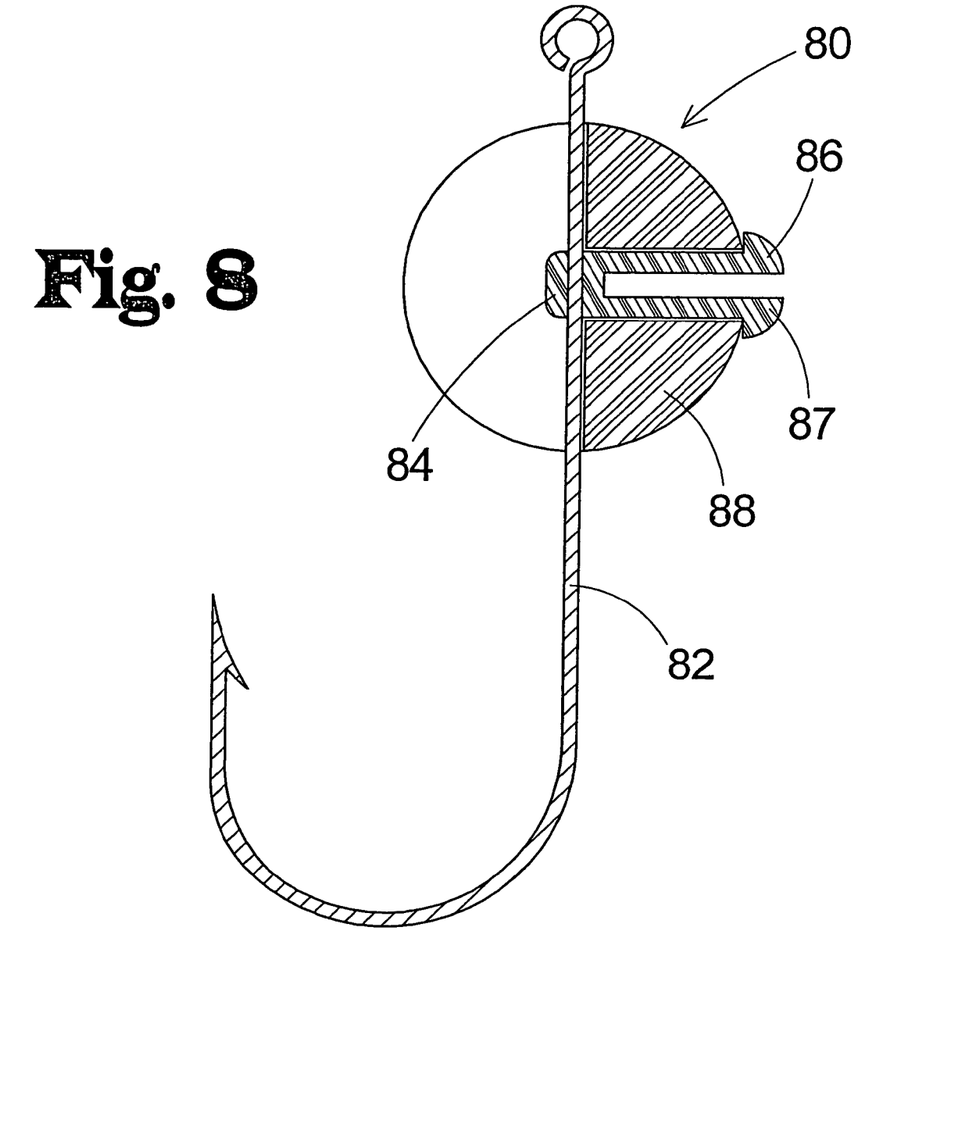
FIG. 8 is a schematic sectional view of a variation of the present invention for a J-shaped hook.
Figure 9:
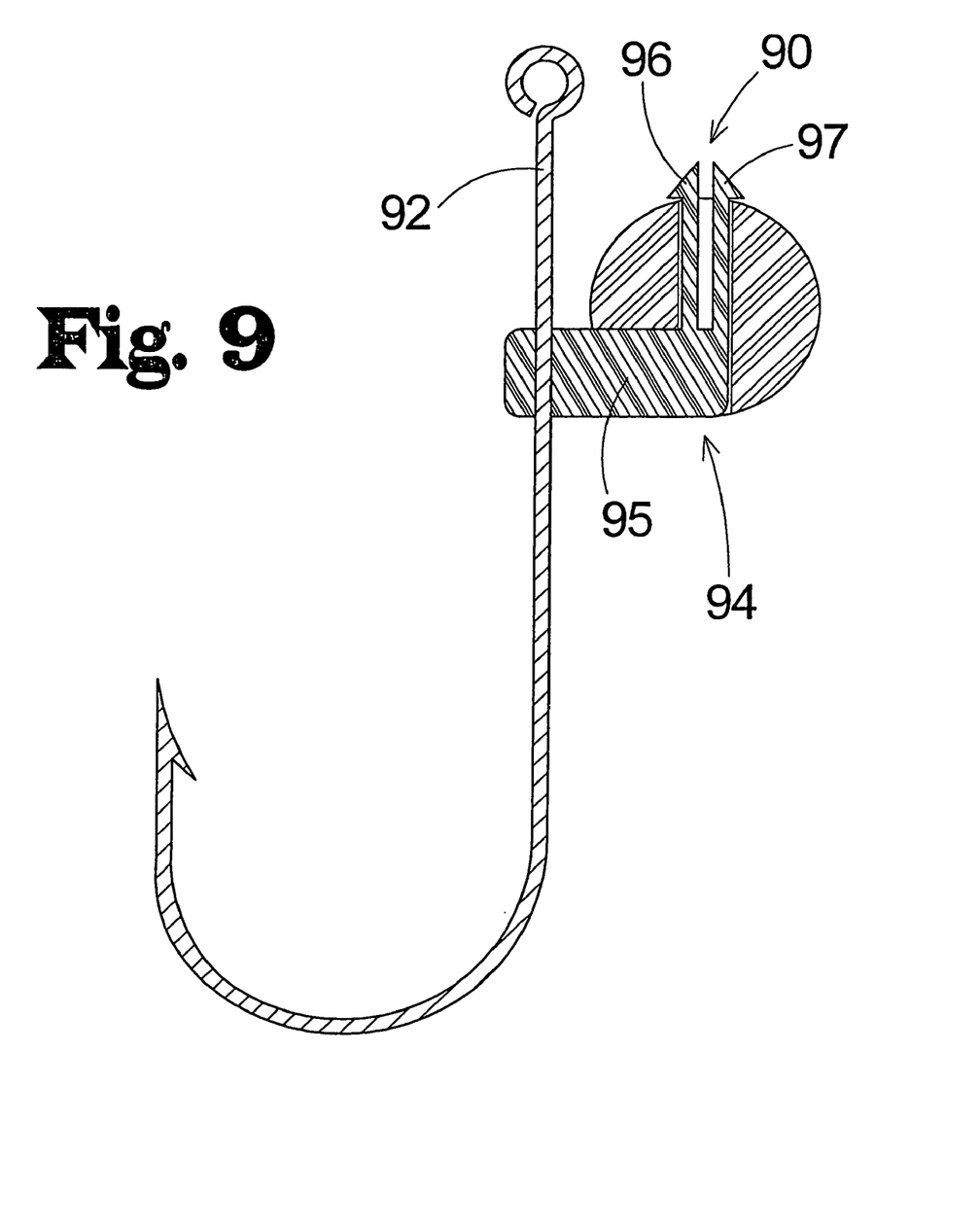
FIG. 9 is a schematic sectional view of another variation of the present invention for a J-shaped hook.
Figure 10:
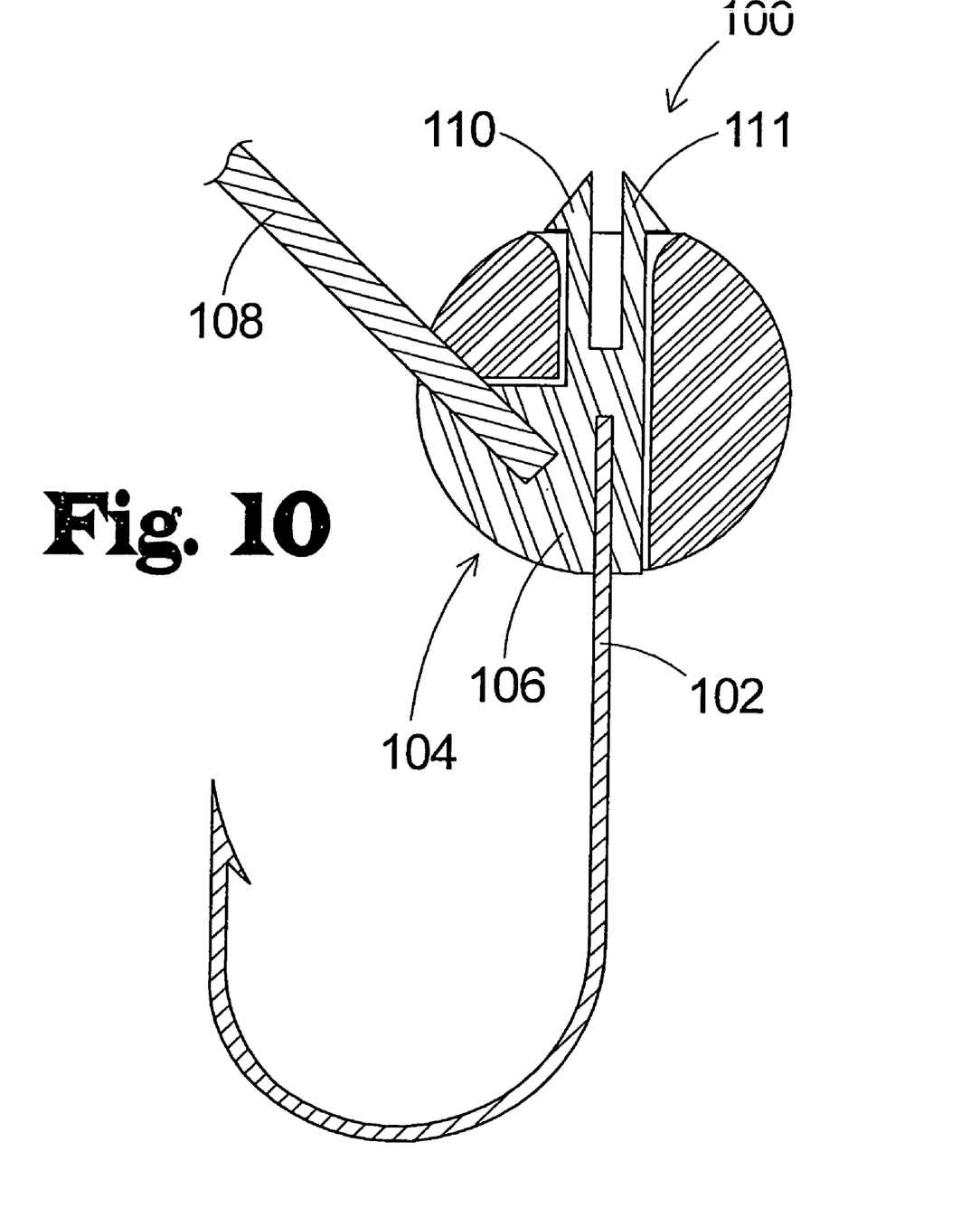
FIG. 10 is a schematic sectional view of yet another variation of the present invention for use with another type of hook.

It should be understood that the invention is not limited to use with hooks having a bend located at the juncture of the shank and eye portions of the hook, and FIGS. 8 through 10 show variations of the invention employed on different hook configurations. In the system 80 in FIG. 8, the hook 82 has a mounting member 84 mounted thereon that extends from the shaft of the hook, and the mounting member has a pair of securing fingers 86, 87. A jig head 88 is removably mounted on the securing fingers 86, 87 of the mounting member 84. The jig head may include a semicircular recess through which the shaft of the hook 82 extends, and a passage that extends from the recess to a substantially opposite side of the jig head.

In FIG. 9, another variation 90 of the invention is shown with a hook 92 with a substantially straight shank, and a mounting member 94 having a mounting portion 95 extending substantially perpendicular to the axis of the shank of the hook. Securing fingers 96, 97 of an insertion portion may extend substantially perpendicular to the mounting portion 95, and substantially parallel to the axis of the shank of the hook 92. A jig head 98 is mounted on the insertion portion of the mounting member 94, and includes a recess and passage that is similar in configuration to those elements of the jig head 66 depicted in FIG. 3.

In FIG. 10, a variation 100 of the invention is shown that may be suitably employed with fishing tackle referred to as "spinner baits", or similarly configured fishing tackle elements. A hook 102 is mounted on and extends away from a mounting member 104. A mounting portion 106 of the mounting member 104 may have also have a cantilevered element 108 that mounts the system 100 to the remainder of the spinner bait. Securing fingers 110, 111 of an insertion portion of the mounting member 104 may extend from the mounting portion 106.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A modular fishing hook accessory mounting system for removably mounting a fishing accessory on a hook, the system comprising:

a hook having a shank portion and an eye portion, the eye portion being located at one end of the shank portion;

a modular mounting member mounted on the hook for removably receiving a fishing accessory; and a fishing accessory removably mounted on the modular mounting member, the fishing accessory having a recess formed therein for slidably receiving at least a portion of the modular mounting member;

wherein the modular mounting member includes a pair of spaced securing fingers removably insertable into the recess of the fishing accessory for removably securing the fishing accessory to the hook; and wherein the pair of securing fingers define a gap therebetween, at least a first finger of the pair of securing fingers being resiliently flexible toward a second finger of the air of securing fingers to minimize the gap.

2. The system of claim 1 wherein the shank portion and the eye portion of the hook meet at a juncture, the modular mounting member being located at the juncture of the hook.

3. The system of claim 1 wherein the modular mounting member comprises a mounting portion mounted on the hook, an insertion portion for inserting into the fishing accessory, and securing means for removably securing the fishing accessory on the modular mounting member, the securing means including the pair of securing fingers.

4. The system of claim 3 wherein the shank portion and the eye portion of the hook meet at a juncture, the mounting portion embracing the juncture of the hook and extends along a portion of the hook adjacent to the juncture.

5. The system of claim 4 wherein the mounting portion includes a rib extending from the eye portion toward a throat of the hook.

6. The system of claim 3 wherein the pair of securing fingers extend from the insertion portion beyond the eye portion of the hook.

7. The system of claim 1 wherein the pair of securing fingers each include a retaining nub formed thereon, the retaining nubs extending in substantially opposite directions from each other.

8. The system of claim 7 wherein each of the nubs has a tapered thickness toward a first end of the nub, the nubs each forming a ledge toward a second end of the nub.

9. The system of claim 1 additionally comprising an extension portion extending from the modular mounting member along a section of the shank portion of the hook from the insertion portion toward the throat of the hook.

10. The system of claim 9 wherein the extension portion includes a barb for removably engaging an article of artificial bait.

11. The system of claim 9 wherein the extension portion includes a clip hook for removably engaging a fishing accessory, the clip hook being positioned away from the eye portion of the hook and away from the mounting portion of the modular mounting member.

12. The system of claim 9 wherein the extension portion includes a weed guard for diverting weeds from a throat of the hook, the weed guard extending across the throat of the hook toward a point of the hook.

13. The system of claim 9 wherein the extension portion includes a skirt of filaments extending in a direction away from the insertion portion of the modular mounting member.

14. The system of claim 9 additionally comprising a removable fishing article assembly for removably engaging the extension portion of the modular mounting member, the extension portion having a substantially annular retainer groove extending about the extension portion, the fishing article assembly including a retainer clip for removably mounting on the extension portion in the groove.

15. The system of claim 14 wherein the fishing article assembly comprises a rattle-producing structure mounted on the retainer clip, the rattle-producing structure being adapted to produce a rattle when the hook is moved through water.

16. The system of claim 14 wherein the fishing article assembly comprises a weed guard mounted on the retainer clip, the weed guard including at least one strand extending across the throat of the hook toward the point of the hook.

17. The system of claim 14 wherein the fishing article assembly comprises a skirt mounted on the retainer clip, the skirt comprising a plurality of filaments.

18. The system of claim 1 wherein the recess includes a passage extending through the fishing accessory for receiving an insertion portion of the modular mounting member and wherein the recess includes a slot in communication with the passage for receiving the mounting portion of the modular mounting member.

19. The system of claim 1 wherein the securing fingers extend substantially parallel to each other.

20. The system of claim 1 wherein the securing fingers define a gap therebetween.

21. The system of claim 1 wherein the securing fingers are resiliently flexible.

22. The system of claim 1 wherein the securing fingers extend away from the hook.

23. The system of claim 1 wherein at least one of the pair of securing fingers includes a retaining nub formed thereon, the retaining nub extending from the at least one securing finger in a manner resisting removal of the fishing accessory from the securing fingers.

24. A modular fishing hook accessory mounting system for removably mounting a fishing accessory on a hook, the system comprising:
  a hook having a shank portion and an eye portion, the eye portion being located at one end of the shank portion;
  a modular mounting member mounted on the hook for removably receiving a fishing accessory; and
  a fishing accessory removably mounted on the modular mounting member, the fishing accessory having a recess formed therein for slidably receiving at least a portion of the modular mounting member;
  wherein the shank portion is substantially linear, the eye portion lying in a plane oriented substantially perpendicular to a longitudinal axis of the shank portion;
  wherein the modular mounting member has a longitudinal axis, the modular mounting member comprising:
    a mounting portion mounted on the hook, the mounting portion embracing the juncture of the hook, the mounting portion extending along a portion of the hook adjacent to the juncture, the mounting portion extending along a section of the shank portion of the hook, the mounting portion extending along a section of the eye portion of the hook, the mounting portion including a rib extending from the eye portion toward a throat of the hook;
    an insertion portion for inserting into the fishing accessory, the insertion portion extending along a section of the shank portion, the insertion portion being elongate, a longitudinal axis of the insertion portion being laterally offset from a longitudinal axis of the shank portion of the hook, an exterior of the insertion portion being substantially cylindrical; and
    securing means for removably securing the fishing accessory on the modular mounting member, the securing means extending beyond the eye portion of the hook, the securing means comprising a securing structure, the securing structure comprising:
      a pair of securing fingers defining a gap therebetween, the pair of securing fingers being resiliently flexible toward each other to minimize the gap, the pair of securing fingers being substantially parallel to each other;
      a retaining nub formed on each of the pair of securing fingers, the retaining nubs extending in substantially opposite directions from each other, each of the nubs having a tapered thickness toward a first end of the nub, the nubs each forming a ledge toward a second end of the nub;
    an extension portion extending from the insertion portion, the extension portion extending along a section of the shank portion of the hook from the insertion portion toward the throat of the hook, the extension portion including:
      a barb for removably engaging an article of artificial bait, the barb having a tip extending toward the eye portion of the hook and toward mounting portion of the modular mounting member;
      a clip hook for removably engaging a fishing accessory, the clip hook being positioned away from the eye portion of the hook and away from the mounting portion of the modular mounting member, the clip hook being substantially arcuate along its length such that the clip hook extends away from and back towards the shank portion of the hook;

a weed guard for diverting weeds from a throat of the hook, the weed guard extending across the throat of the hook toward a point of the hook;

a skirt of filaments extending in a direction away from the insertion portion of the modular mounting member;

a removable fishing article assembly for removably engaging the extension portion of the modular mounting member, the extension portion having a substantially annular retainer groove extending about the extension portion, the fishing article assembly including:

a retainer clip for removably mounting on the extension portion in the groove, the retainer clip comprising a ring with a break in the ring for permitting the extension portion to pass through the break to permit the retainer clip to engage the retainer groove;

a rattle-producing structure mounted on the retainer clip, the rattle-producing structure being adapted to produce a rattle when the hook is moved through water;

a weed guard mounted on the retainer clip, the weed guard including at least one strand extending across the throat of the hook toward the point of the hook;

a skirt mounted on the retainer clip, the skirt comprising a plurality of filaments;

wherein the recess of the fishing accessory includes a passage extending through the fishing accessory for receiving the insertion portion of the modular mounting member, the recess including a slot in communication with the passage for receiving the mounting portion of the modular mounting member, the fishing accessory comprising a jig head, the fishing accessory comprising a substantially spherical object, the fishing accessory comprising a metallic weight.

25. A modular fishing book accessory mounting system for removably mounting a fishing accessory on a hook, the system comprising:

a hook having a shank portion and an eye portion, the eye portion being located at one end of the shank portion;

a modular mounting member mounted on the hook for removably receiving a fishing accessory; and a fishing accessory removably mounted on the modular mounting member, the fishing accessory having a recess formed therein for slidably receiving at least a portion of the modular mounting member;

wherein the modular mounting member comprises a mounting portion mounted on the hook, an insertion portion for inserting into the fishing accessory, and securing means for removably securing the fishing accessory on the modular mounting member;

wherein the securing means comprises a securing structure extending from the insertion portion beyond the eye portion of the hook; and wherein the securing structure comprises a pair of securing fingers defining a gap therebetween, the pair of securing fingers being resiliently flexible toward each other to minimize the gap.

26. The system of claim 25 wherein the securing structure includes a retaining nub formed on each of the pair of securing fingers, the retaining nubs extending in substantially opposite directions from each other.

27. The system of claim 26 wherein each of the nubs has a tapered thickness toward a first end of the nub, the nubs each forming a ledge toward a second end of the nub.

* * * * *